US007226980B2

(12) United States Patent
Yeager

(10) Patent No.: US 7,226,980 B2
(45) Date of Patent: Jun. 5, 2007

(54) THERMOSET COMPOSITION, METHOD FOR THE PREPARATION THEREOF, AND ARTICLES PREPARED THEREFROM

(75) Inventor: Gary William Yeager, Rexford, NY (US)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 10/637,943

(22) Filed: Aug. 7, 2003

(65) Prior Publication Data

US 2005/0032979 A1 Feb. 10, 2005

(51) Int. Cl.
C08L 71/12 (2006.01)

(52) U.S. Cl. .................. 525/391; 526/319; 526/321; 526/324; 526/328; 526/329.2; 526/346; 526/227; 528/173; 528/205

(58) Field of Classification Search .................. 525/905, 525/152, 132, 148, 149; 526/280, 284, 308, 526/318, 319, 328
See application file for complete search history.

(56) References Cited

U.S. PATENT DOCUMENTS

| | | | |
|---|---|---|---|
| 3,306,874 A | 2/1967 | Hay | |
| 3,306,875 A | 2/1967 | Hay | |
| 3,375,228 A | 3/1968 | Holoch et al. | |
| 3,557,045 A | 1/1971 | Wright et al. | |
| 3,597,216 A | 8/1971 | Berardinelli et al. | |
| 3,637,578 A | 1/1972 | Wright et al. | |
| 3,883,612 A | 5/1975 | Pratt et al. | |
| 3,936,414 A | 2/1976 | Wright et al. | |
| 4,011,200 A | 3/1977 | Yonemitsu et al. | |
| 4,038,343 A | 7/1977 | Yonemitsu et al. | |
| 4,048,143 A | 9/1977 | Hay et al. | |
| 4,131,729 A | 12/1978 | Schitt et al. | |
| 4,148,843 A | 4/1979 | Goossens | |
| 4,165,422 A | 8/1979 | White et al. | |
| 4,172,951 A | 10/1979 | Gruber et al. | |
| 4,286,021 A * | 8/1981 | Brendley, Jr. ............... | 428/413 |
| 4,337,349 A | 6/1982 | Orlowski et al. | |
| 4,562,243 A | 12/1985 | Percec | |
| 4,579,904 A | 4/1986 | Orlowski et al. | |
| 4,604,417 A | 8/1986 | Cottman | |
| 4,634,742 A | 1/1987 | Percec | |
| 4,663,402 A | 5/1987 | Percec et al. | |
| 4,665,137 A | 5/1987 | Percec et al. | |
| 4,677,185 A | 6/1987 | Heitz et al. | |
| 4,701,514 A | 10/1987 | Percec | |
| 4,744,827 A | 5/1988 | Winkel et al. | |
| 4,760,118 A | 7/1988 | White et al. | |
| H521 H | 9/1988 | Fan | |

(Continued)

FOREIGN PATENT DOCUMENTS

| | | |
|---|---|---|
| DE | 31 17 514 A1 | 5/1981 |
| DE | 41 03 140 A1 | 2/1991 |
| EP | 135124 | 8/1984 |
| EP | 206072 | 9/1986 |
| EP | 0 261 574 B1 | 9/1987 |
| EP | 0 385 065 A1 | 1/1990 |
| EP | 0 498 088 A1 | 12/1991 |
| JP | S60-115609 | 6/1985 |
| JP | 60115609 A * | 6/1985 |
| NL | 8902092 | 8/1989 |
| WO | WO 01/40354 | 6/2001 |
| WO | WO 01/53413 | 7/2001 |

OTHER PUBLICATIONS

Coleen Pugh and V. Percec, "Group Transfer Polymerization of Some Unusual Acrylates and Methacrylates", Polym. Prepr. (Am. Chem. Soc., Div. Polym. Chem.), (1985), 26(2), 303–5.
Chan et al., Macromolecules Facile Quantitative Analysis of Hydroxl End Groups of Poly (2,6–dimethyl–1,4–phenylene oxide)s by 31P NMR Spectroscopy; vol. 27, No. 22; Oct. 24, 1994; pp. 6371–6375.
Monte et al. "Coupling composites with titante during extrusion processing" Modern Plastics; May 1984; pp. 74–78.
Gachter, et al. Plastics Additive Handbook: "Stabilizers, Processing Aids, Plasticizers, Fillers, Reinforcements, Colorants for Thermoplastics"; 4th Edition; Hanser Publishers, pp. 914–935.
Cohen, L.B. "Zircoaluminates strengthen premium ranges of chemical coupling agents"; Plastics Engineering; vol. 39; No. 11; Nov. 1983; pp. 29–32.
Monte et al. "A New Generation of Age and Water Resistant and Reinforced Plastics"; Annual Technical Conference; 1979; pp. 1–10.
Derwent Abstract for JP08–245872.
Chemical Abstract for 109:171608.
Chemical Abstract for 125:12414.
U.S. Appl. No. 09/943,342, Yeager et al.
U.S. Appl. No. 10/188,181, Yeager et al.
Chemical Abstract for 98:73296.
Chemical Abstract for 99:213561.
Chemical Abstract for JP 61–174208.
Chemical Abstract for JP 61–278913.
International Search Report; International Application No. PCT/US2004/020868; International Filing Date Jun. 29, 2004; Date of Mailing Nov. 11, 2004 (6 pages).
English translation of JP 60–115609.*
structural depiction of tricyclodecane dimethylol diacrylate taken from Aldrich Handbook of Fine Chemicals (2000–2001) at page.*

*Primary Examiner*—Marc S. Zimmer
(74) *Attorney, Agent, or Firm*—Cantor Colburn LLP

(57) ABSTRACT

A curable composition includes a poly(arylene ether) and a fused alicyclic (meth)acrylate monomer. Also described are a method of preparing the composition, a cured composition derived from the curable composition, and an article comprising the cured composition. The composition is useful, for example, as a bulk molding compound.

36 Claims, No Drawings

U.S. PATENT DOCUMENTS

| | | |
|---|---|---|
| 4,806,601 A | 2/1989 | Percec |
| 4,816,515 A | 3/1989 | Weiss |
| 4,871,816 A | 10/1989 | Percec et al. |
| 4,874,826 A | 10/1989 | Sakamoto et al. |
| 4,888,397 A | 12/1989 | van der Meer et al. |
| 4,923,932 A | 5/1990 | Katayose et al. |
| 4,923,942 A | 5/1990 | Takeyama et al. |
| 5,039,781 A | 8/1991 | Neugebauer et al. |
| 5,061,602 A | 10/1991 | Koch et al. |
| 5,071,922 A | 12/1991 | Nelissen et al. |
| 5,079,268 A | 1/1992 | Nelissen et al. |
| 5,091,480 A | 2/1992 | Percec et al. |
| 5,171,761 A | 12/1992 | Penco et al. |
| 5,213,886 A | 5/1993 | Chao et al. |
| 5,218,030 A | 6/1993 | Katayose et al. |
| 5,219,951 A | 6/1993 | Nelissen et al. |
| 5,304,600 A | 4/1994 | Nelissen et al. |
| 5,310,820 A | 5/1994 | Nelissen et al. |
| 5,338,796 A | 8/1994 | Vianello et al. |
| 5,352,745 A | 10/1994 | Katayose et al. |
| 5,407,972 A | 4/1995 | Smith et al. |
| 5,612,425 A | 3/1997 | Weber et al. |
| 5,834,565 A | 11/1998 | Tracy et al. |
| 5,851,646 A | 12/1998 | Takahashi et al. |
| 5,965,663 A | 10/1999 | Hayase |
| 6,022,550 A | 2/2000 | Watanabe |
| 6,051,662 A | 4/2000 | Tracy et al. |
| 6,251,308 B1 | 6/2001 | Butler |
| 6,306,963 B1 | 10/2001 | Lane et al. |
| 6,352,782 B2 | 3/2002 | Yeager |
| 6,384,176 B1 | 5/2002 | Braat et al. |
| 6,469,124 B2 | 10/2002 | Braat et al. |
| 6,521,703 B2 | 2/2003 | Zarnoch et al. |
| 6,569,982 B2 | 5/2003 | Hwang et al. |
| 6,593,391 B2 | 7/2003 | Teutsch et al. |
| 6,617,398 B2 | 9/2003 | Yeager et al. |
| 6,627,704 B2 | 9/2003 | Yeager |
| 6,627,708 B2 | 9/2003 | Braat et al. |
| 2002/0169256 A1 | 11/2002 | Merfeld et al. |
| 2002/0173597 A1 | 11/2002 | Zarnoch et al. |
| 2002/0177027 A1 | 11/2002 | Yeager et al. |

* cited by examiner

THERMOSET COMPOSITION, METHOD FOR THE PREPARATION THEREOF, AND ARTICLES PREPARED THEREFROM

BACKGROUND

Thermoset compositions are employed in a wide variety of techniques for article fabrication, including, for example, resin transfer molding, sheet molding, bulk molding, pultrusion, injection molding (including reaction injection molding and atmospheric pressure molding), and the like. Thermoset compositions comprising poly(arylene ether) resins, both unfunctionalized and functionalized, have been described. For example, U.S. Pat. No. 6,051,662 to Tracy et al. describes a curable composition comprising a thermosetting resin and a low molecular weight, unfunctionalized poly(arylene ether) resin. U.S. Pat. No. 6,521,703 to Zamoch et al. describes a curable resin composition includes an unsaturated polyester, an alkenyl aromatic compound, and a capped poly(arylene ether). As another example, U.S. Pat. No. 6,352,782 to Yeager et al. describes a composition comprising a reactively endcapped poly(phenylene ether) resin and a curable unsaturated monomer composition.

There remains a need for a thermoset composition exhibiting improved dielectric properties.

BRIEF SUMMARY

A curable composition exhibiting improved dielectric properties comprises a poly(arylene ether) and a fused alicyclic (meth)acrylate monomer.

Other embodiments, including a method for preparing the curable composition, reaction products obtained from the curable composition, and articles comprising the cured composition, are described below.

DETAILED DESCRIPTION OF THE PREFERRED EMBODIMENTS

One embodiment is a curable composition comprising a poly(arylene ether) and a fused alicyclic (meth)acrylate monomer. The poly(arylene ether) resin may be unfunctionalized or functionalized.

An unfunctionalized poly(arylene ether) resin may be obtained directly from the polymerization of a monohydric phenol. The poly(arylene ether) described herein as "uncapped" or "unfunctionalized" comprises repeating structural units having the formula

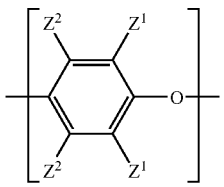

wherein for each structural unit, each $Z^1$ is independently halogen, primary or secondary $C_1$–$C_{12}$ alkyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_1$–$C_{12}$ halohydrocarbyloxy wherein at least two carbon atoms separate the halogen and oxygen atoms, or the like; and each $Z^2$ is independently hydrogen, halogen, primary or secondary $C_1$–$C_{12}$ alkyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_1$–$C_{12}$ halohydrocarbyloxy wherein at least two carbon atoms separate the halogen and oxygen atoms, or the like. Preferably, each $Z^1$ is $C_{1-4}$ alkyl, and each $Z^2$ is hydrogen or methyl.

Both homopolymer and copolymer poly(arylene ether)s are included. The preferred homopolymers are those comprising 2,6-dimethylphenylene ether units. Suitable copolymers include random copolymers comprising, for example, 2,6-dimethylphenylene ether units in combination with 2,3,6-trimethyl-1,4-phenylene ether units or copolymers derived from copolymerization of 2,6-dimethylphenol with 2,3,6-trimethylphenol.

The unfunctionalized poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials. The unfunctionalized poly(arylene ether) may also be prepared by reaction of a preformed poly(arylene ether) with a bisphenol, optionally in the presence of a radical-producing catalyst such as a peroxide, or by reaction of a higher molecular weight poly(arylene ether) with a quinone and or a peroxide to form a lower molecular weight poly(arylene ether).

Particularly useful unfunctionalized poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups. Methods for synthesizing unfunctionalized poly(arylene ether) homopolymers and copolymers are described, for example, in U.S. Pat. Nos. 3,306,874 and 3,306,875 to Hay, and U.S. Pat. Nos. 4,011,200 and 4,038,343 to Yonemitsu et al.

The poly(arylene ether) may be a functionalized poly(arylene ether). Functionalized poly(arylene ether) resins include, for example, capped poly(arylene ether) resins and ring-functionalized poly(arylene ether) resins.

The capped poly(arylene ether) may be represented by the structure $$Q(J-K)_y$$ 

wherein Q is the residuum of a monohydric, dihydric, or polyhydric phenol; y is 1 to about 100; J comprises repeating structural units having the formula

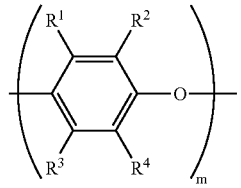

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_2$ alkynyl, $C_1$–$C_2$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; m is 1 to about 200, preferably 1 to about 100, more preferably 1 to 49; and K is a capping group selected from

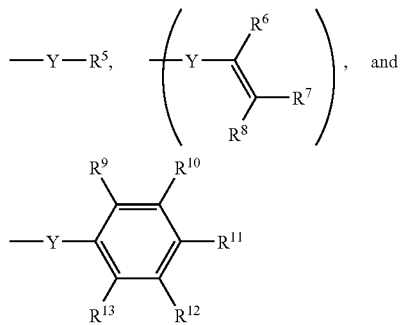

wherein $R^5$ is $C_1$–$C_{12}$ alkyl; $R^6$–$R^8$ are each independently hydrogen, $C_1$–$C_{18}$ hydrocarbyl, $C_2$–$C_{18}$ hydrocarbyloxycarbonyl, nitrile, formyl, carboxylate, imidate, thiocarboxylate, or the like; $R^9$–$R^{13}$ are each independently hydrogen, halogen, $C_1$–$C_{12}$ alkyl, hydroxy, amino, or the like; and wherein Y is a divalent group selected from

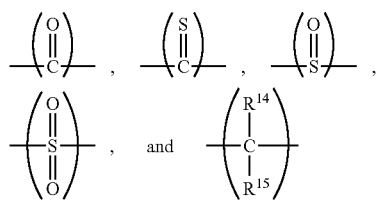

wherein $R^{14}$ and $R^{15}$ are each independently hydrogen, $C_1$–$C_{12}$ alkyl, or the like. As used herein, "hydrocarbyl" refers to a residue that contains only carbon and hydrogen. The residue may be aliphatic or aromatic, straight-chain, cyclic, branched, saturated or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. As used herein, the term "haloalkyl" includes alkyl groups substituted with one or more halogen atoms, including partially and fully halogenated alkyl groups.

In one embodiment, Q is the residuum of a phenol, including polyfunctional phenols, and includes radicals of the structure

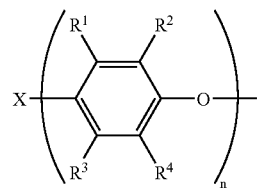

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; X may be hydrogen, $C_1$–$C_{18}$ hydrocarbyl, or $C_1$–$C_{18}$ hydrocarbyl containing at least one substituent such as carboxylic acid, aldehyde, hydroxy, amino, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may also be the residuum of a diphenol, such as 2,2',6,6'-tetramethyl-4,4'-diphenol.

In one embodiment, the capped poly(arylene ether) is produced by capping a poly(arylene ether) consisting essentially of the polymerization product of at least one monohydric phenol having the structure

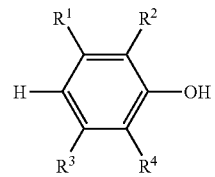

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In one embodiment, the capped poly(arylene ether) comprises at least one capping group having the structure

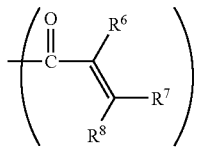

wherein $R^6$–$R^8$ are each independently hydrogen, $C_1$–$C_{18}$ hydrocarbyl, $C_2$–$C_{12}$ hydrocarbyloxycarbonyl, nitrile, formyl, carboxylate, imidate, thiocarboxylate, or the like. Highly preferred capping groups include acrylate ($R^6$=$R^7$=$R^8$=hydrogen) and methacrylate ($R^6$=methyl, $R^7$=$R^8$=hydrogen).

In another embodiment, the capped poly(arylene ether) comprises at least one capping group having the structure

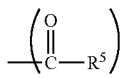

wherein $R^5$ is $C_1$–$C_{12}$ alkyl, preferably $C_1$–$C_6$ alkyl, more preferably methyl, ethyl, or isopropyl. The advantageous properties of composition can be achieved even when the capped poly(arylene ether) lacks a polymerizable function such as a carbon—carbon double bond.

In yet another embodiment, the capped poly(arylene ether) comprises at least one capping group having the structure

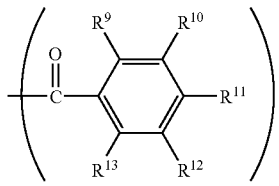

wherein $R^9$–$R^{13}$ are each independently hydrogen, halogen, $C_1$–$C_{12}$ alkyl, hydroxy, amino, or the like. Preferred capping groups of this type include salicylate ($R^9$=hydroxy, $R^{10}$–$R^{13}$=hydrogen).

In still another embodiment, the capped poly(arylene ether) comprises at least one capping group having the structure

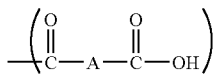

wherein A is a saturated or unsaturated $C_2$–$C_{12}$ divalent hydrocarbon group such as, for example, ethylene, 1,2-propylene, 1,3-propylene, 2-methyl-1,3-propylene, 2,2-dimethyl-1,3-propylene, 1,2-butylene, 1,3-butylene, 1,4-butylene, 2-methyl-1,4-butylene, 2,2-dimethyl-1,4-butylene, 2,3-dimethyl-1,4-butylene, vinylene (—CH═CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl) carbonate, acryloyl esters, methacryloyl esters, acetyl esters, phenylisocyanate, 3-isopropenyl-alpha, α-dimethylphenylisocyanate, cyanatobenzene, 2,2-bis(4-cyanatophenyl)propane), 3-(α-chloromethyl)styrene, 4-(α-chloromethyl)styrene, allyl bromide, and the like, carbonate and substituted derivatives thereof, and mixtures thereof. These and other methods of forming capped poly(arylene ether)s are described, for example, in U.S. Pat. Nos. 3,375,228 to Holoch et al.; U.S. Pat. No. 4,148,843 to Goossens; U.S. Pat. Nos. 4,562,243, 4,663,402, 4,665,137, 4,701,514, [4,871,876] 4,871.816, and U.S. Pat. No. 5,091,480 to Percec et al.; U.S. Pat. No. 5,071,922, 5,079,268, 5,304,600, and U.S. Pat. No. 5,310,820 to Nelissen et al.; U.S. Pat. No. 5,338,796 to Vianello et al.; U.S. Pat. No. 6,352,782 to Yeager et al.; U.S. Pat. No. 6,384,176 to Braat et al.; U.S. Patent Application Publication No. 2001/0053820 A1 of Yeager et al.; and European Patent No. 261,574 B1 to Peters et al.

In a preferred embodiment, the capped poly(arylene ether) may be prepared by, reaction of an uncapped poly (arylene ether) with an anhydride in an alkenyl aromatic monomer as solvent. This approach has the advantage of generating the capped poly(arylene ether) in a form that can be immediately blended with other components to form a curable composition. Using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The functionalized poly(arylene ether) may be a ring-functionalized poly(arylene ether). In one embodiment, the ring-functionalized poly(arylene ether) is a poly(arylene ether) comprising repeating structural units of the formula

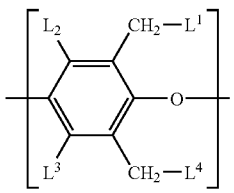

wherein each $L^1$–$L^4$ is independently hydrogen, a $C_1$–$C_{12}$ alkyl group, a $C_2$–$C_{12}$ alkenyl group, or a $C_2$–$C_{12}$ alkynyl group; wherein the alkenyl group is represented by

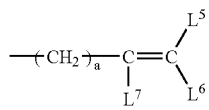

wherein $L^5$–$L^7$ are independently hydrogen or methyl, and a is an integer from 0 to 4 (i.e., 0, 1, 2, 3, or 4); wherein the alkynyl group is represented by

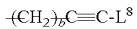

wherein $L^8$ is hydrogen, methyl, or ethyl, and b is an integer from 0 to 4 (i.e., 0, 1, 2, 3, or 4); and wherein about 0.02 mole percent to about 25 mole percent of the total $L^1$–$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

In another embodiment, the functionalized poly(arylene ether) is the product of the melt reaction of a poly(arylene ether) and an α,β-unsaturated carbonyl compound or a β-hydroxy carbonyl compound to produce an acid- or anhydride-functionalized poly(arylene ether). In some embodiments both acid and anhydride functionality may be present. Examples of unsaturated carbonyl compounds include, for example, fumaric acid, maleic acid, maleic anhydride, itaconic acid, itaconic anhydride, citraconic acid, citraconic anhydride, as well as various derivatives of the foregoing and similar compounds. Examples of α,β-hydroxy carbonyl compounds include, for example, citric acid, malic acid, and the like. Such functionalization is typically carried out by melt mixing the poly(arylene ether) with the desired carbonyl compound at a temperature of about 190 to about 290° C.

The composition may comprise a blend of at least two functionalized poly(arylene ether)s. Such blends may be prepared from individually prepared and isolated functionalized poly(arylene ether)s. Alternatively, such blends may be prepared by reacting a single poly(arylene ether) with at least two functionalizing agents. For example, a poly(arylene ether) may be reacted with two capping agents, or a poly(arylene ether) may be metalized and reacted with two unsaturated alkylating agents. In another alternative, a mixture of at least two poly(arylene ether) resins having different monomer compositions and/or molecular weights may be reacted with a single functionalizing agent to generate the blend of at least two functionalized poly(arylene ether)s.

Functionalized poly(arylene ether)s further include poly(arylene ether)s containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer.

There is no particular limitation on the molecular weight or intrinsic viscosity of the poly(arylene ether). The poly(arylene ether) may have a number average molecular weight ($M_n$) of about 1,000 to about 100,000 atomic mass units (AMU). In one embodiment, the composition may comprise an unfunctionalized poly(arylene ether) having a number average molecular weight (Mn) of about 10,000 to about 50,000 atomic mass units (AMU). Within this range, the $M_n$ value of the unfunctionalized poly(arylene ether) may preferably be at least about 15,000. Also within this range, the $M_n$ value of the unfunctionalized poly(arylene ether) may preferably be up to about 30,000 AMU, more preferably up to about 25,000 AMU. In another embodiment, the composition may comprise a functionalized poly(arylene ether) having a number average molecular weight of about 8,000 to about 25,000 atomic mass units (AMU). Within this range, it may be preferable to use a functionalized poly(arylene ether) having a number average molecular weight of at least about 10,000 AMU, more preferably at least about 15,000 AMU.

The intrinsic viscosity of the poly(arylene ether) may be about 0.02 to about 1.5 deciliters/gram (dL/g), preferably about 0.05 to about 0.6 dL/g, as measured in chloroform at 25° C. In one embodiment, the composition may comprise an unfunctionalized poly(arylene ether) having an intrinsic viscosity of about 0.1 to about 1.0 dl/g. Within this range, the functionalized poly(arylene ether) intrinsic viscosity may preferably be at least about 0.2 dL/g, more preferably at least 0.3 dl/g. Also within this range, the functionalized poly(arylene ether) intrinsic viscosity may preferably be up to about 0.6 dL/g, still more preferably up to about 0.5 dL/g. In another embodiment, the composition may comprise a functionalized poly(arylene ether) having an intrinsic viscosity of about 0.1 to about 0.6 deciliters per gram (dL/g) as measured in chloroform at 25° C. Within this range, the functionalized poly(arylene ether) intrinsic viscosity may preferably be at least about 0.2 dL/g, more preferably at least 0.25 dL/g. Also within this range, the functionalized poly(arylene ether) intrinsic viscosity may preferably be up to about 0.5 dL/g, still more preferably up to about 0.4 dL/g. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly(arylene ether). It is expressly contemplated to employ blends of at least two functionalized poly(arylene ether)s having different molecular weights and intrinsic viscosities.

The poly(arylene ether) includes combinations of any of the above unfunctionalized and functionalized poly(arylene ether) resins.

The composition may comprise the poly(arylene ether) in an amount of about 5 to about 95 parts by weight per 100 parts by weight total of the functionalized poly(arylene ether) and the fused alicyclic (meth)acrylate monomer. Within this range, it may be preferred to use a poly(arylene ether) amount of at least about 10 parts by weight, more preferably at least about 20 parts by weight, still more preferably at least about 30 parts by weight, even more preferably at least about 35 parts by weight. Also within this range, it may be preferred to use a poly(arylene ether) amount of up to about 90 parts by weight, more preferably up to about 80 parts by weight, yet more preferably up to about 70 parts by weight.

The curable composition comprises a fused alicyclic (meth)acrylate monomer. In one embodiment, the fused alicyclic (meth)acrylate monomer has the formula

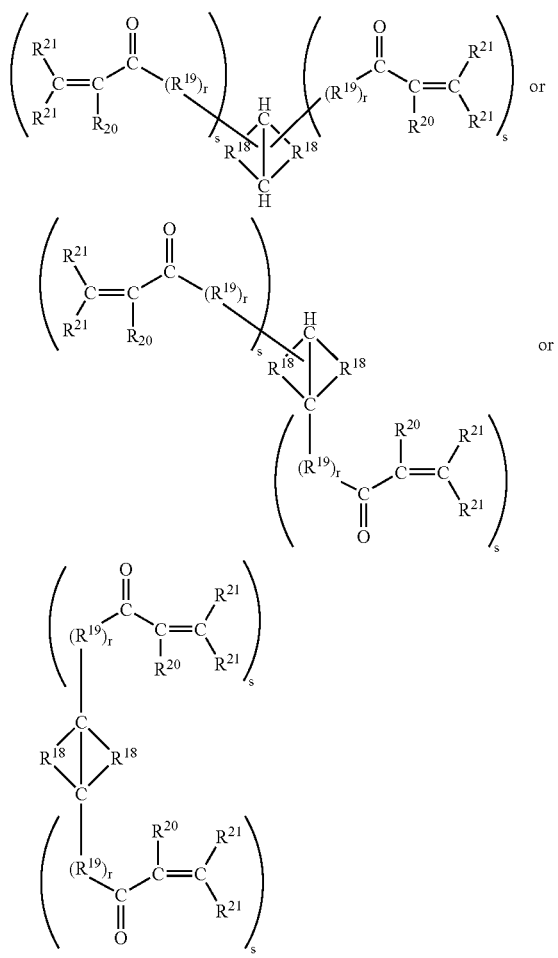

wherein each occurrence of $R^{18}$ is independently $C_1$–$C_{12}$ alkylene, $C_1$–$C_{12}$ hydroxy-substituted alkylene, or the like; each occurrence of $R^{19}$ is independently a divalent group such as $C_1$–$C_{18}$ hydrocarbylene, oxygen (—O—), sulfur (—S—), carbonyl (—C(=O)—), thiocarbonyl (—C(=S)—), sulfoxyl (—S(=O)—), sulfonyl (—S(=O)$_2$—), and amine (—N($R^{22}$)— wherein $R^{22}$ is hydrogen or $C_1$–$C_{18}$ hydrocarbyl), or the like; each occurrence of r is independently 0 to about 12; each occurrence of $R^{20}$ and $R^{21}$ is independently hydrogen, $C_1$–$C_{12}$ alkyl, or the like; and each occurrence of s is independently 0 or 1 or 2 with the proviso that at least one occurrence of s is at least 1. It will be understood that the $R_{18}$ alkylene and hydroxy-substituted alkylene groups may be straight chain, branched, or cyclic. In a preferred embodiment, $R^1$ is $C_1$–$C_4$ alkylene. It will also be understood that when r is greater than 1, the multiple occurrences of $R^{19}$ may be the same or different. For example, if s is 2, one occurrence of $R^{19}$ may be carbonyl, and the other occurrence of $R^{19}$ may be amine, thereby forming an amide linkage for the two adjacent occurrences of $R^{19}$. Thus, multiple occurrences of $R^{19}$ may be used to form amide, ester, thioester, carbonate, sulfamoyl, urea, and sulfonamide linkages, and the like. In one embodiment, each occurrence of $R^{20}$ is hydrogen or methyl, and each occurrence of $R^{21}$ is hydrogen. In another embodiment each occurrence of r is zero.

Suitable fused alicyclic (meth)acrylate monomers include, for example, 3α-(meth)acryloyloxyperhydroindene, 3α-(meth)acryloyloxy-7α-hydroxyperhydroindene, 3α,7α-bis[(meth)acryloyloxy] perhydroindene, 4α-(meth)acryloyloxydecalin, 4α,8α-bis [(meth)acryloyloxy]decalin, 4α-(meth) acryloyloxyperhydrofluorene, 4α-(meth)acryloyloxy-9α-hydroxyperhydrofluorene, 4α,9α-bis[(meth)acryloyloxy] perhydrofluorene, 4α-(meth) acryloyloxyperhydroanthracene, 4α-(meth)acryloyloxy-9α-hydroxyperhydroanthracene, 4α,9α-bis[(meth)acryloyloxy] perhydroanthracene, 10α-(meth) acryloyloxyperhydrophenanthrene, 10α-(meth)acryloyloxy-4αhydroxyperhydrophenanthrene, 4α,10α-bis[(meth) acryloyloxy]perhydrophenanthrene, 2-(meth) acryloyloxytricyclo[5.2.1.0$^{2,6}$] decane, 2-(meth) acryloyloxy-6-hydroxytricyclo[5.2.1.0$^{2,6}$]decane, 2,6-bis [(meth)acryloyloxy] tricyclo[5.2.1.0$^{2,6}$]decane, 2,5-bis [(meth)acryloyloxy]tricyclo[5.2.1.0$^{2,6}$]decane, 2α-(meth) acryloyloxyperhydroacenaphthene, 2α-(meth)acryloyloxy-8α-hydroxyperhydroacenaphthene, 2,8α-bis[(meth) acryloyloxy]perhydroacenaphthene, 3α-(meth)acryloyloxy] perhydroacenaphthene, 3α-(meth)acryloyloxy-9α-hydroxyperhydroacenaphthene, 3,9α-bis[(meth) acryloyloxy]perhydroacenaphthene, and the like, and combinations of the foregoing fused alicyclic (meth)acrylate monomers.

In one embodiment, the fused alicyclic (meth)acrylate monomer has the formula

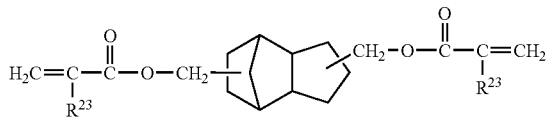

wherein each occurrence of $R^{23}$ is independently hydrogen or methyl. In a preferred embodiment, $R^{23}$ is methyl.

The composition comprises about 5 to about 95 parts by weight of the fused alicyclic (meth)acrylate monomer per 100 parts by weight total of the poly(arylene ether) and the fused alicyclic (meth)acrylate monomer. Within this range, the amount of fused alicyclic (meth)acrylate monomer may preferably be at least about 10 parts by weight, more preferably at least about 20 parts by weight, still more preferably at least about 30 parts by weight. Also within this range, the amount of fused alicyclic (meth)acrylate monomer may preferably be up to about 70 parts by weight, more preferably up to about 65 parts by weight.

The curable composition may, optionally, further comprise an alkenyl aromatic monomer. The alkenyl aromatic monomer may have the structure

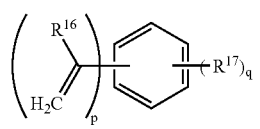

wherein each occurrence of $R^{16}$ is independently hydrogen or $C_1$–$C_{18}$ hydrocarbyl; each occurrence of $R^{17}$ is independently halogen, $C_1$–$C_{12}$ alkyl, $C_1$–$C_{12}$ alkoxyl, $C_6$–$C_{18}$ aryl, or the like; p is 1 to 4; and q is 0 to 5. Unspecified positions on the aromatic ring are substituted with hydrogen atoms. Suitable alkenyl aromatic monomers include, for example, styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. A preferred alkenyl aromatic monomer is styrene. When present, the alkenyl aromatic monomer may be used at about 10 to about 1000 parts by weight per 100 parts by weight total of the poly(arylene ether) and the fused alicyclic (meth)acrylate monomer. Within this range, the alkenyl aromatic monomer amount may preferably be at least about 20 parts by weight, more preferably at least about 40 parts by weight. Also within this range, the alkenyl aromatic monomer amount may preferably be up to about 500 parts by weight, more preferably up to about 200 parts per weight.

The curable composition may, optionally, further comprise a curing catalyst to increase the curing rate of the unsaturated components. Curing catalysts, also referred to as initiators, are well known to the art and used to initiate the polymerization, cure or crosslink any of numerous thermoplastics and thermosets including unsaturated polyester, vinyl ester and allylic thermosets. Non-limiting examples of curing catalysts are those described in "Plastic Additives Handbook, 4$^{th}$ Edition" R. Gachter and H. Muller (eds.), P. P. Klemchuck (assoc. ed.) Hansen Publishers, New York 1993, and in U.S. Pat. Nos. 5,407,972 to Smith et al., and U.S. Pat. No. 5,218,030 to Katayose et al. The curing catalyst for the unsaturated portion of the thermoset may include any compound capable of producing radicals at elevated temperatures. Such curing catalysts may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha, alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, and the like, and mixtures comprising at least one of the foregoing curing catalysts. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts. The curing catalyst for the unsaturated portion of the thermoset may further include any compound capable of initiating anionic polymerization of the unsaturated components. Such anionic polymerization catalysts include, for example, alkali metal amides, such as sodium amide (NaNH$_2$) and lithium diethyl amide (LiN(C$_2$H$_2$)$_2$); alkali metal and ammonium salts of C$_1$–C$_{10}$ alkoxides; alkali metal and ammonium hydroxides; alkali metal cyanides; organometallic compounds such as the alkyl lithium compound n-butyl lithium and the Grignard reagent phenyl magnesium bromide; and the like; and combinations comprising at least one of the foregoing anionic polymerization catalysts.

In a preferred embodiment, the curing catalyst may comprise t-butylperoxybenzoate or methyl ethyl ketone peroxide. The curing catalyst may promote curing at a temperature of about 0° C. to about 200° C.

When present, the curing catalyst may be used in an amount of about 0.1 to about 10 parts by weight per 100 parts total of the poly(arylene ether) and the fused alicyclic (meth)acrylate monomer. Within this range, it may be preferred to use a curing catalyst amount of at least about 0.5 parts by weight, more preferably at least about 1 part by weight. Also within this range, it may be preferred to use a curing catalyst amount of up to about 5 parts by weight, more preferably up to about 3 parts by weight.

The curable composition may, optionally, further comprise a curing promoter to decrease the gel time. Suitable curing promoters include transition metal salts and complexes such as cobalt naphthanate; and organic bases such as N,N-dimethylaniline (DMA) and N,N-diethylaniline (DEA). Preferably, cobalt naphthanate and DMA are used in combination. When present, the curing promoter may be used in an amount of about 0.05 to about 3 parts, per 100 parts total of the poly(arylene ether) and the fused alicyclic (meth)acrylate monomer.

The composition may further comprise one or more fillers, including particulate fillers and fibrous fillers. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (as its anhydride, dihydrate or trihydrate), calcium carbonate including chalk, limestone, marble and synthetic, precipitated calcium carbonates, generally in the form of a ground particulate which often comprises 98+% CaCO$_3$ with the remainder being other inorganics such as magnesium carbonate, iron oxide, and alumino-silicates; surface-treated calcium carbonates; talc, including fibrous, modular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; natural silica sand, quartz; quartzite; perlite; Tripoli; diatomaceous earth; synthetic silica, including those with various silane coatings, and the like.

Preferred particulate fillers include calcium carbonates having an average particle size of about 1 to about 10 micrometers. Within this range, the average particle size may be at least about 2 micrometers, or at least about 3 micrometers. Also within this range, the average particle size may be up to about 8 micrometers, or up to about 7 micrometers.

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Preferred fibrous fillers include glass fibers having a diameter of about 5 to about 25 micrometers and a length before compounding of about 0.5 to about 4 centimeters. Many other suitable fillers are described in U.S. Patent Application Publication No. 2001/0053820 A1 to Yeager et al.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1–3, R is an alkyl or aryl group and Y is a reactive functional group which can enable formation of a bond with a polymer molecule. Particularly useful examples of coupling agents are those having the structure $(RO)_3SiY$. Typical examples include vinyl-triethoxysilane, vinyl tris(2-methoxy)silane, γ-methacryloxypropyltrimethoxy silane, γ-aminopropyltriethoxysilane, γ-glycidoxypropyltrimethoxysilane, and γ-mercaptopropyltrimethoxysilane. Titanates include those developed by S. J. Monte et al. in Ann. Chem. Tech Conf. SPI (1980), Ann. Tech Conf. Reinforced Plastics and Composite Inst. SPI 1979, Section 16E, New Orleans; and S. J. Monte, Mod. Plastics Int., volume 14, number 6 pg. 2 (1984). Zirco-aluminates include those described by L. B. Cohen in Plastics Engineering, volume 39, number 11, page 29 (1983). The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

In a preferred embodiment, the filler comprises calcium carbonate. In another preferred embodiment, the filler comprises glass fibers. In a highly preferred embodiment, the filler comprises both calcium carbonate and glass fibers.

When present, the particulate filler may be used in an amount of about 5 to about 80 weight percent, based on the total weight of the composition. Within this range, it may be preferred to us a particulate filler amount of at least about 1 weight percent, more preferably at least about 20 weight percent, yet more preferably at least about 30 weight percent, still more preferably at least about 40 weight percent. Also within this range, it may be preferred to use a particulate filler amount of up to about 70 weight percent, more preferably up to about 60 weight percent. Alternatively the particulate filler amount may be expressed as about 5 to about 1000 parts by weight based on 100 parts by weight total for the poly(arylene ether) and the fused alicyclic (meth)acrylate monomer.

When present, the fibrous filler may be used in an amount of about 2 to about 80 weight percent, based on the total weight of the composition. Within this range, it may be preferred to us a fibrous filler amount of at least about 5 weight percent, more preferably at least about 10 weight percent, still more preferably at least about 15 weight percent, even more preferably at least about 20 weight percent. Also within this range, it may be preferred to use a fibrous filler amount of up to about 60 weight percent, more preferably up to about 40 weight percent, still more preferably up to about 30 weight percent. Alternatively the fibrous filler amount may be expressed as about 5 to about 1000 parts by weight based on 100 parts by weight total for the poly(arylene ether) and the fused alicyclic (meth)acrylate monomer.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, antioxidants, heat stabilizers, light stabilizers, plasticizers, lubricants, flow modifiers, flame retardants, drip retardants, antiblocking agents, antistatic agents, flow-promoting agents, processing aids, and the like, and combinations thereof. Those skilled in the art may select suitable additives and determine suitable amounts.

One embodiment is a curable composition, comprising: a methacrylate-capped poly(arylene ether), and a fused alicyclic (meth)acrylate monomer having the formula

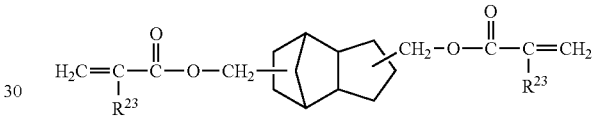

wherein each occurrence of $R^{23}$ is independently hydrogen or methyl.

Another embodiment is a curable composition, comprising: about 5 to about 95 parts by weight of a methacrylate-capped poly(arylene ether); about 5 to about 95 parts by weight of a fused alicyclic (meth)acrylate monomer having the formula

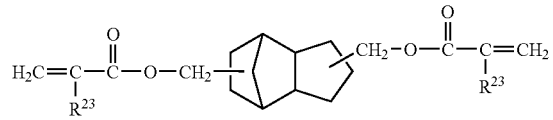

wherein each occurrence of $R^{23}$ is independently hydrogen or methyl; about 50 to about 600 parts by weight of calcium carbonate; and about 50 to about 600 parts by weight of glass fibers.

There is no particular limitation on the method by which the composition is prepared. The composition may be prepared by forming an intimate blend comprising the poly (arylene ether) and the fused alicyclic (meth)acrylate monomer. When the composition comprises an alkenyl aromatic monomer and the poly(arylene ether) is a capped poly (arylene ether), the composition may be prepared directly from an unfunctionalized poly(arylene ether) by dissolving the uncapped poly(arylene ether) in a portion of the alkenyl aromatic monomer, adding a capping agent form the capped poly(arylene ether) in the presence of the alkenyl aromatic monomer, and adding the fused alicyclic (meth)acrylate monomer and any other components to form the thermoset composition.

There is no particular limitation on the method by which the composition may be cured. The composition may, for example, be cured thermally or by using irradiation techniques, including, for example, UV irradiation and electron beam irradiation. When heat curing is used, the temperature selected may be about 80° to about 300° C. Within this range, a temperature of at least about 120° C. may be preferred. Also within this range, a temperature up to about 240° C. may be preferred. The heating period may be about 30 seconds to about 24 hours. Within this range, it may be preferred to use a heating time of at least about 1 minute, more preferably at least about 2 minutes. Also within this range, it may be preferred to use a heating time up to about 10 hours, more preferably about 5 hours, yet more preferably up to about 3 hours. Such curing may be staged to produce a partially cured and often tack-free resin, which then is fully cured by heating for longer periods or temperatures within the aforementioned ranges.

One embodiment is a cured composition obtained by curing any of the above-described curable compositions. Because the components of the curable composition may react with each other during curing, the cured composition may be described as comprising the reaction product obtained by curing the curable composition components. Thus, one embodiment is a cured composition, comprising the reaction product obtained by curing a composition comprising a poly(arylene ether) and a fused alicyclic (meth)acrylate. It will be understood that the terms "curing" and "cured" include partial curing to form, for example, so-called B-stage compositions. Another embodiment is a cured composition, comprising the reaction product of: a methacrylate-capped poly(arylene ether); and a fused alicyclic (meth)acrylate monomer having the formula

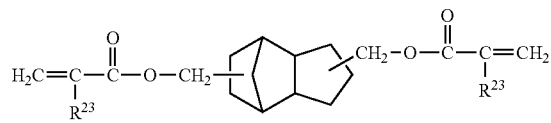

wherein each occurrence of $R^{23}$ is independently hydrogen or methyl. Another embodiment is a cured composition, comprising the reaction product obtained by curing: about 5 to about 95 parts by weight of a methacrylate-capped poly(arylene ether); about 5 to about 95 parts by weight of a fused alicyclic (meth)acrylate monomer having the formula

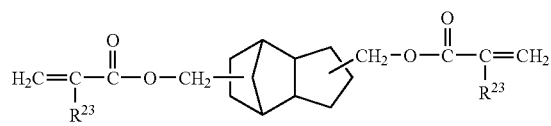

wherein each occurrence of $R_{23}$ is independently hydrogen or methyl; about 50 to about 600 parts by weight of calcium carbonate; and about 50 to about 600 parts by weight of glass fibers.

Another embodiment is an article comprising any of the cured compositions. The curable composition is useful for fabricating a wide range of articles. Articles that may be fabricated from the composition include, for example, acid bath containers, neutralization tanks, electrorefining tanks, water softener tanks, fuel tanks, filament-wound tanks, filament-wound tank linings, electrolytic cells, exhaust stacks, scrubbers, automotive exterior panels, automotive floor pans, automotive air scoops, truck bed liners, drive shafts, drive shaft couplings, tractor parts, transverse leaf springs, crankcase heaters, heat shields, railroad tank cars, hopper car covers, boat hulls, submarine hulls, boat decks, marine terminal fenders, aircraft components, propeller blades, missile components, rocket motor cases, wing sections, sucker rods, fuselage sections, wing skins, wing flairings, engine narcelles, cargo doors, aircraft stretch block and hammer forms, bridge beams, bridge deckings, stair cases, railings, walkways, pipes, ducts, fan housings, tiles, building panels, scrubbing towers, flooring, expansion joints for bridges, injectable mortars for patch and repair of cracks in structural concrete, grouting for tile, machinery rails, metal dowels, bolts, posts, electrical encapsulants, electrical panels, printed circuit boards, electrical components, wire windings, seals for electromechanical devices, battery cases, resistors, fuses, thermal cut-off devices, coatings for printed wiring boards, capacitors, transformers, electrically conductive components for antistatic applications, tennis racquets, golf club shafts, fishing rods, skis, ski poles, bicycle parts, swimming pools, swimming pool slides, hot tubs, saunas, mixers, business machine housings, trays, dishwasher parts, refrigerator parts, furniture, garage doors, gratings, protective body gear, luggage, optical waveguides, radomes, satellite dishes, signs, solar energy panels, telephone switchgear housings, transformer covers, insulation for rotating machines, commutators, core insulation, dry toner resins, bonding jigs, inspection fixtures, industrial metal forming dies, vacuum molding tools, and the like. The composition is particularly useful for fabricating printed circuit boards, encapsulating compositions, potting compounds, and composites for electrical insulation.

The composition exhibits highly desirable properties. For example the composition after molding may exhibit a glass transition temperature of at least about 110° C. As another example, the composition after molding may exhibit a coefficient of thermal expansion below the glass transition temperature of up to about 75 parts per million, measured according to ASTM D6341. The cured composition may also exhibit a dissipation factor, measured according to ASTM D150 at 25° C. and 1 kilohertz or 10 kilohertz or 100 kilohertz or 1 megahertz, of less than or equal to 0.02, preferably less than or equal to 0.01, more preferably less than or equal to 0.005. In one embodiment, the cured composition exhibits dissipation factors, measured according to ASTM D150 at 25° C., of less than or equal to 0.005 at each of 1 kilohertz and 10 kilohertz and 100 kilohertz and 1 megahertz.

The invention is further illustrated by the following non-limiting examples.

PREPARATIVE EXAMPLE 1

The procedure described in Example 1 of U.S. Patent Application Publication No. 2001/0053820 A1 to Yeager et al. was used to prepare a methacrylate-capped poly(2,6-dimethyl-1,4-phenylene ether) having an intrinsic viscosity of 0.25 dL/g at 25° C. in chloroform and a residual hydroxyl content of 136.22 micromole —OH per gram of poly (arylene ether). Briefly, the compound was prepared by reacting the unfunctionalized poly(2,6-dimethyl-1,4-phenylene ether) with methacrylic anhydride and dimethylaminopyridine catalyst in toluene solvent, precipitating the product with methanol, filtering, and drying. The methacrylate-capped poly(2,6-dimethyl-1,4-phenylene ether) was dissolved in styrene to form a 35 weight percent solution.

EXAMPLES 1–4

The methacrylate-capped poly(2,6-dimethyl-1,4-phenylene ether) from Preparative Example 1 was blended with tricyclo[5.2.1.0$^{2,6}$]decanedimethanol in the proportions shown in Table 1. To each solution 2 parts by weight of t-butylperoxybenzoate was added. The compositions were compression molded for 8 minutes at 120° C. and 5,000 pounds per square inch for eight minutes to yield disk-shaped samples. Properties were measured on the compression-molded samples. Glass transition temperatures ($T_g$) and coefficients of thermal expansion (CTE) were determined according to ASTM D6341. CTE values were measured both above and below the glass transition temperature. Decomposition onset temperature and percent residue were measured by thermogravimetric analysis (TGA). Compositions (with amounts expressed in parts by weight, pbw) and properties are summarized in Table 1. The data show that the compositions comprising the poly(arylene ether) and the fused alicyclic (meth)acrylate compound exhibit high glass transition temperatures and low coefficients of thermal expansion.

TABLE 1

|  | Ex. 1 | Ex. 2 | Ex. 3 | Ex. 4 |
|---|---|---|---|---|
| Composition |  |  |  |  |
| capped PPE solution, 35% in styrene (pbw) | 80 | 75 | 70 | 65 |
| tricyclo[5.2.1.0$^{2,6}$]decanedimethanol diacrylate (pbw) | 20 | 25 | 30 | 35 |
| t-butylperoxybenzoate (pbw) | 2 | 2 | 2 | 2 |
| Properties |  |  |  |  |
| Tg (° C.) | 115 | 113 | 118 | 122 |
| CTE < $T_g$ (ppm) | 72 | 74 | 74 | 74 |
| CTE < $T_g$ (ppm) | 207 | 211 | 218 | 223 |
| TGA Decomposition Onset (° C.) | 408 | 404 | 413 | 407 |
| TGA Residue (wt %) | 4.5 | 4.2 | 4.7 | 3.6 |

EXAMPLE 5, COMPARATIVE EXAMPLE 1

A 35% solution of methacrylate-capped poly(2,6-dimethyl-1,4-phenylene ether) in styrene was heated to about 70–80° C. and stirred until fluid. Tricyclo[5.2.1.0$^{2,6}$] decanedimethanol diacrylate was added in the amount shown in Table 2 and the solution cooled to 50° C. t-Butylperoxybenzoate was added and the solution was vigorously stirred. The resulting resin was cooled to room temperature and cured under pressure at 150° C. and 5000 psi. A control sample was prepared using trimethylolpropane triacrylate in place of tricyclo[5.2.1.0$^{2,6}$]decanedimethanol diacrylate. Dissipation factors were measured according to ASTM D150 at 1, 10, and 100 kilohertz, and 1 megahertz. Compositions and properties are shown in Table 2. The results show that the Example 5 compositions with the fused alicyclic acrylate, exhibited consistently and substantially lower dissipation factors than the Comparative Example 1 composition with trimethylolpropane trimethacrylate.

TABLE 2

|  | Ex. 5 | C. Ex. 1 |
|---|---|---|
| Composition |  |  |
| Capped PPE solution, 35% in styrene (pbw) | 80 | 80 |
| Tricyclo[5.2.1.0$^{2,6}$]decanedimethanol diacrylate (pbw) | 20 | 0 |
| Trimethylolpropane trimethacrylate (pbw) | 0 | 20 |
| t-Butylperoxybenzoate (pbw) | 2 | 2 |

TABLE 2-continued

|  | Ex. 5 | C. Ex. 1 |
|---|---|---|
| Properties |  |  |
| Dissipation Factor at 1 kilohertz | 0.0013 | 0.120 |
| Dissipation Factor at 10 kilohertz | 0.0019 | 0.0182 |
| Dissipation Factor at 100 kilohertz | 0.0020 | 0.0042 |
| Dissipation Factor at 1 megahertz | 0.0034 | 0.0046 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A curable composition, comprising:
    a poly(arylene ether); wherein the poly(arylene ether) is a functionalized poly(arylene ether); and wherein the poly(arylene ether) is prepared by a method comprising oxidative coupling of at least one monohydroxyaromatic compound; and
    a fused alicyclic (meth)acrylate monomer.

2. A curable composition, comprising:
    a poly(arylene ether); prepared by a method comprising oxidative coupling of at least one monohydroxyaromatic compound; and
    a fused alicyclic (meth) acrylate monomer;
    wherein the poly(arylene ether) is a functionalized poly (arylene ether); and
    wherein the functionalized poly(arylene ether) is a capped poly(arylene ether); and having the structure $Q(J-K)_y$ wherein Q is the medium of a monohydric, dihydric, or polyhydric phenol; y is 1 to 100; J comprises repeating structural units having the formula

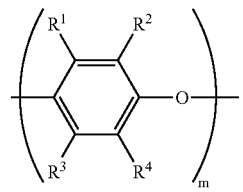

wherein $R_1$ and $R^3$ are each independently hydrogen, halogen, primary or secondary $C_1-C_{12}$ alkyl, $C_2-C_{12}$ alkenyl, $C_2-C_{12}$ alkynyl, $C_1-C_{12}$ aminoalkyl, $C_1-C_{12}$ hydroxyalkyl, phenyl, $C_1-C_{12}$ haloalkyl, $C_1-C_{12}$ hydrocarbyloxy, or $C_2-C_{12}$ halohydrocarbyloxy wherein at least two carbon atoms separate the halogen and oxygen atoms; m is 1 to about 200; $R^2$ and $R^4$ are each independently halogen, primary or secondary $C_1-C_{12}$ alkyl, $C_2-C_{12}$ alkenyl, $C_2-C_{12}$ alkynyl, $C_1-C_{12}$ aminoalkyl, $C_1-C_{12}$ hydroxyalkyl, phenyl, $C_1$–$C_{12}$ haloalkyl, $C_1$–$C_{12}$ hydrocarbyloxy, or $C_2$–$C_{12}$ halohydrocarbyloxy wherein at least two carbon atoms separate the halogen and oxygen atoms; m is 1 to about 200; and K is a capping group selected from

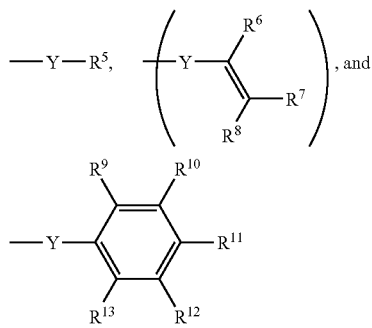

wherein $R^5$ is $C_1$–$C_{12}$ alkyl; $R^6$–$R^8$ are each independently hydrogen, $C_1$–$C_{18}$ hydrocarbyl, $C_2$–$C_{18}$ hydrocarbyloxycarbonyl, nitrile, formyl, carboxylate, imidate, or thiocarboxylate; $R^9$–$R^{13}$ are each independently hydrogen, halogen, $C_1$–$C_{12}$ alkyl, hydroxy, or amino; and wherein Y is a divalent group selected from

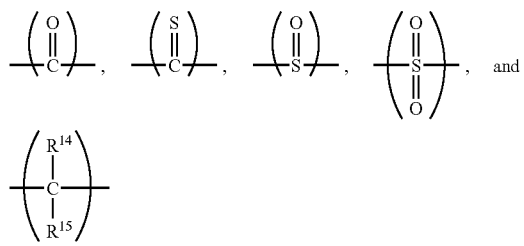

wherein $R^{14}$ and $R^{15}$ are each independently hydrogen or $C_1$–$C_{12}$ alkyl.

3. A curable composition, comprising:
a poly(arylene ether) prepared by a method comprising oxidative coupling of at least one monohydroxyaromatic compound; and
a fused alicyclic (meth)acrylate monomer;
wherein the poly(arylene ether) is a functionalized poly(arylene ether); and
wherein the functionalized poly(arylene ether) is a capped poly(arylene ether) having the structure Q(J-K)

wherein Q is the residuum of a monohydric phenol; y is 1 to 100; J comprises repeating structural units having the formula

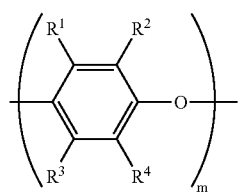

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, or $C_2$–$C_{12}$ halohydrocarbyloxy wherein at least two carbon atoms separate the halogen and oxygen atoms; m is 1 to about 200: $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, or $C_2$–$C_{12}$ halohydrocarbyloxy wherein at least two carbon atoms separate the halogen and oxygen atoms; m is 1 to about 200: and K is a capping group selected from

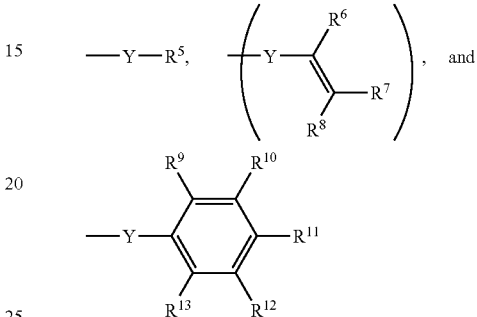

wherein $R^5$ is $C_1$–$C_{12}$ alkyl: $R^6$–$R^8$ are each independently hydrogen, $C_1$–$C_{18}$ hydrocarbyl, $C_2$–$C_{18}$ hydrocarbyloxycarbonyl, nitrile, formyl, carboxylate, imidate, or thiocarboxylate; $R^9$–$R^{13}$ are each independently hydrogen, halogen, $C_1$–$C_{12}$ alkyl, hydroxy, or amino; and wherein Y is a divalent group selected from

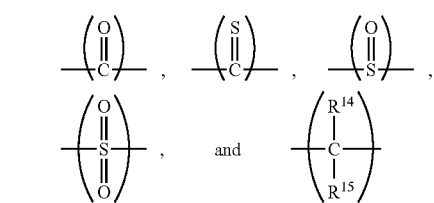

wherein $R^{14}$ and $R^{15}$ are each independently hydrogen or $C_1$–$C_{12}$ alkyl.

4. A curable composition, comprising:

a poly(arylene ether); prepared by a method comprising oxidative coupling of at least one monohydroxyaromatic compound; and
a fused alicyclic (meth)acrylate monomer;
wherein the poly(arylene ether) is a functionalized poly(arylene ether); and
wherein the functionalized poly(arylene ether) is a capped poly(arylene ether) having the structure Q(J-K)

wherein Q is the residuum of a monohydric, dihydric, or polyhydric phenol; y is 1 to 100; J comprises repeating structural units having the formula

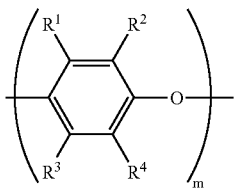

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, or $C_1$–$C_{12}$ halohydrocarbyloxy wherein at least two carbon atoms separate the halogen and oxygen atoms; m is 1 to about 200: $R^2$ and $R^4$ are each independently halogen, primary or secondary $C_1$–$C_{12}$ alkyl, $C_2$–$C_{12}$ alkenyl, $C_2$–$C_{12}$alkynyl, $C_1$–$C_{12}$ aminoalkyl, phenyl, $C_1$–$C_{12}$ haloalkyl, $C_1$–$C_{12}$ hydrocarbyloxy, or $C_2$–$C_{12}$ halohydrocarbyloxy wherein at least two carbon atoms separate the halogen and oxygen atoms; m is 1 to about 200; and K is a capping group selected from

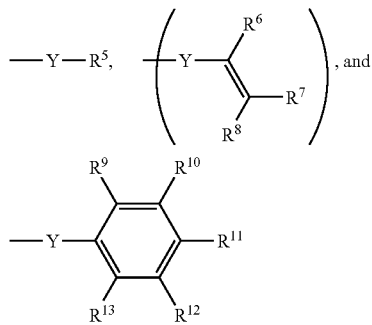

wherein $R^5$ is $C_1$–$C_{12}$ alkyl, $R^6$–$R^8$ are each independently hydrogen, $C_1$–$C_{18}$ hydrocarbyl, $C_2$–$C_{18}$ hydrocarbyloxycarbonyl, nitrile, formyl, carboxylate, imidate, or thiocarboxylate; $R^9$–$R^{13}$ are each independently hydrogen, halogen, $C_1$–$C_{12}$ alkyl, hydroxy, or amino; and wherein Y is a divalent group selected from

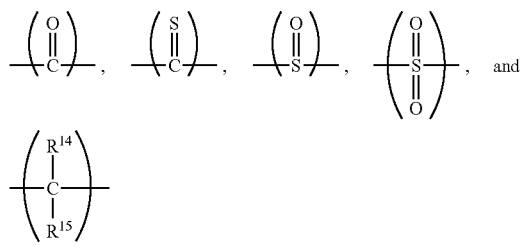

wherein $R^{14}$ and $R^{15}$ are each independently hydrogen or $C_1$–$C_{12}$ alkyl; and wherein the capped poly(arylene ether) comprises at least one capping group having the structure

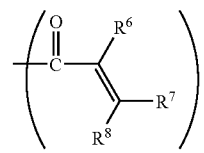

wherein $R^6$–$R^8$ are each independently hydrogen, $C_1$–$C_{18}$ hydrocarbyl, $C_2$–$C_{12}$ hydrocarbyloxycarbonyl, nitrile, formyl, carboxylate, imidate, or thiocarboxylate.

5. A curable composition, comprising:
a poly(arylene ether); and
a fused alicyclic (meth)acrylate monomer;
wherein the poly(arylene ether) is a functionalized poly(arylene ether); and
wherein the functionalized poly(arylene ether) is a ring-functionalized poly(arylene ether) comprising repeating structural units having the formula

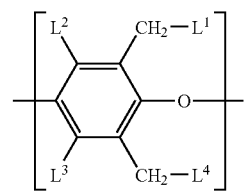

wherein each $L^1$–$L^4$ is independently hydrogen, a $C_1$–$C_{12}$ alkyl group, a $C_2$–$C_{12}$ alkenyl group, or a $C_2$–$C_{12}$ alkynyl group; wherein the alkenyl group is represented by

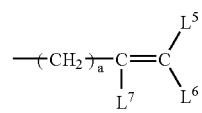

wherein $L^5$–$L^7$ are independently hydrogen or methyl, and a is an integer from 0 to 4; wherein the alkynyl group is represented by

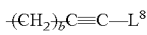

wherein $L_8$ is hydrogen, methyl, or ethyl, and b is an integer from 0 to 4; and wherein about 0.02 mole percent to about 25 mole percent of the total $L^1$–$L_4$ substituents in the ring-functionalized poly(arylene ether) are alkenyl and/or alkynyl groups.

6. A curable composition, comprising:
a poly(arylene ether); and
a fused alicyclic (meth)acrylate monomer;
wherein the poly(arylene ether) is a ring-functionalized poly(arylene ether); and
wherein the ring-functionalized poly(arylene ether) is the product of the melt reaction of a poly(arylene ether) and an α,β-unsubstituted carbonyl compound or a β-hydroxy carbonyl compound.

7. A curable composition, comprising:
a poly(arylene ether) prepared by a method comprising oxidative coupling of at least one monohydroxyaromatic compound; and
a fused alicyclic (meth)acrylate monomer;
wherein the poly(arylene ether) has in instrinsic viscosity of about 0.05 to about 0.6 deciliters per gram measured in chloroform at 25° C.

8. The curable composition of claim 1, wherein the fused alicyclic (meth)acrylate monomer has the formula

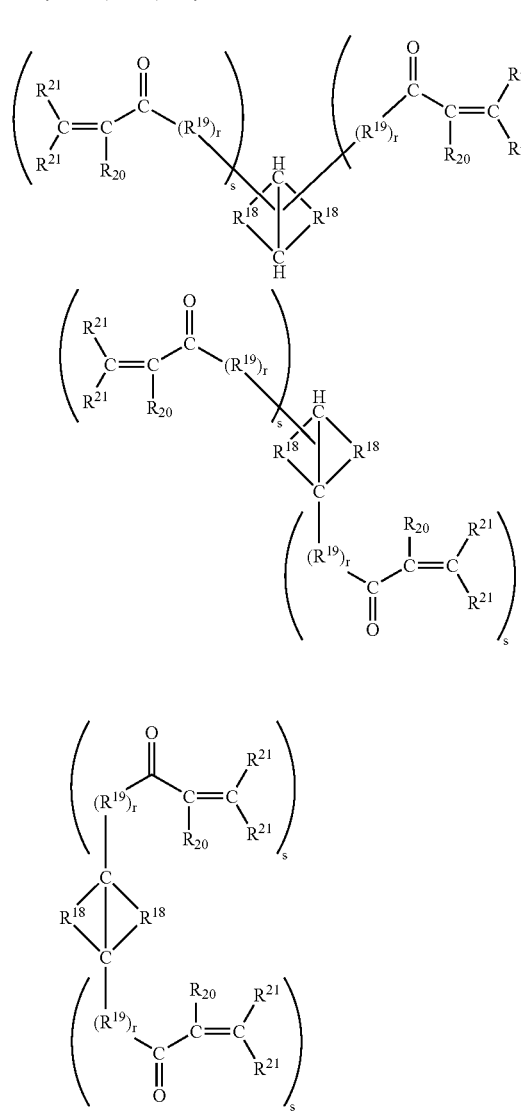

wherein each occurrence of $R^{18}$ is independently $C_1$–$C_{12}$ alkylene or $C_1$–$C_{12}$ hydroxy-substituted alkylene; each occurrence of $R^{19}$ is independently a divalent group selected from $C_1$–$C_{18}$ hydrocarbylene, oxygen (—O—), sulfur (—S—), carbonyl (—C(═O)—), thiocarbonyl (—C(═S)—), sulfoxyl (—S(═O)—), sulfonyl (—S(═O)$_2$—), and amine (—N($R^{22}$)— wherein $R^{22}$ is hydrogen or $C_1$–$C_{18}$ hydrocarbyl); each occurrence of r is independently 0 to about 12; each occurrence of $R^{20}$ and $R^{21}$ is independently hydrogen or $C_1$–$C_{12}$ alkyl; and each occurrence of s is independently 0 or 1 or 2 with the proviso that at least one occurrence of s is at least 1.

9. A curable composition, comprising:

a poly(arylene ether); and a fused alicyclic (meth)acrylate monomer;

wherein the fused alicyclic (meth)acrylate monomer has the formula

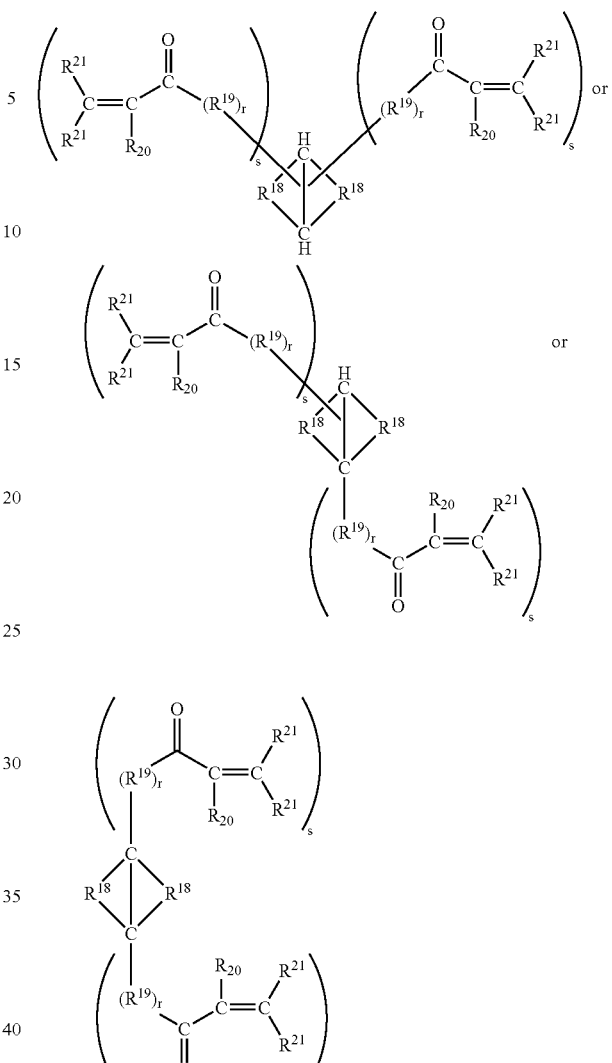

wherein each occurrence of $R^{18}$ is $C_1$–$C_4$ alkylene; each occurrence of $R^{19}$ is independently a divalent group selected from $C_1$–$C_{18}$ hydrocarbylene, oxygen (—O—), sulfur (—S—) carbonyl (—C(═O)—) thiocarbonyl (—C(═S)—), sulfoxyl (—S(═O)—), sulfonyl (—S(═O)$_2$—), and amine (—N($R^{22}$)— wherein $R^{22}$ is hydrogen or $C_1$–$C_{18}$ hydrocarbyl); each occurrence of r is independently 0 to about 12; each occurrence of $R^{20}$ and $R^{21}$ is independently hydrogen or $C_1$–$C_{12}$ alkyl; and each occurrence of s is independently 0 or 1 or 2 with the proviso that at least one occurrence of s is at least 1.

10. The curable composition of claim 8, wherein each occurrence of $R^{20}$ is hydrogen or methyl, and each occurrence of $R^{21}$ is hydrogen.

11. The curable composition of claim 1, further comprising an alkenyl aromatic monomer.

12. The curable composition of claim 11, wherein the alkenyl aromatic monomer has the structure

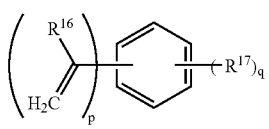

wherein each occurrence of $R^{16}$ is independently hydrogen or $C_1-C_{18}$ hydrocarbyl; each occurrence of $R^{17}$ is independently halogen, $C_1-C_{12}$ alkyl, $C_1-C_{12}$ alkoxyl, or $C_6-C_{18}$ aryl; p is 1 to 4; and q is 0 to 5.

13. The curable composition of claim 11, wherein the alkenyl aromatic monomer is selected from styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 11,3-diisopropenylbenzene, 1,4-diisopropenylbenzene, styrenes having from 1 to 5 halogen substituents on the aromatic ring, and combinations thereof.

14. The curable composition of claim 11, wherein the alkenyl aromatic monomer is styrene.

15. The curable composition of claim 1, further comprising a curing catalyst.

16. The curable composition of claim 15, wherein the curing catalyst is benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, 2,3-dimethyl-2,3-diphenylbutane, 2,3-trimethylsilyloxy-2,3-diphenylbutane, or a combination thereof.

17. A curable composition, comprising:
 a poly(arylene ether); prepared by a method comprising oxidative coupling of at least one monohydroxyaromatic compound;
 a fused alicyclic (meth)acrylate monomer; and
 about 2 to about 80 weight percent of a fibrous filler, based on the total weight of the composition.

18. The curable composition of claim 1, further comprising an additive selected from dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, and combinations thereof.

19. The curable composition of claim 1, wherein the composition after molding exhibits a glass transition temperature of at least about 110° C.

20. The curable composition of claim 1, wherein the composition after molding exhibits a coefficient of thermal expansion below the glass transition temperature of up to about 75 parts per million, measured according to ASTM D6341.

21. The curable composition of claim 1, wherein the composition after curing exhibits a dissipation factor, measured according to ASTM D150 at 25° C. and 1 kilohertz, of less than or equal to 0.005.

22. The curable composition of claim 1, wherein the composition after curing exhibits dissipation factors, measured according to ASTM D150 at 25° C. and each of 1 kilohertz and 10 kilohertz and 100 kilohertz and 1 megahertz, or less than or equal to 0.02.

23. A curable composition, comprising:
 a methacrylate-capped poly(arylene ether) prepared by a method comprising oxidative coupling of at least one monohydroxyaromatic compound; and
 a fused alicyclic (meth)acrylate monomer having the formula

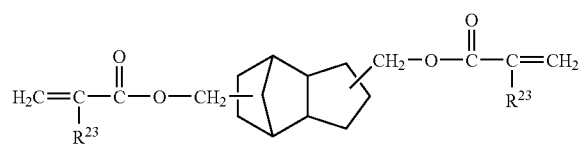

wherein each occurrence of $R^{23}$ is independently hydrogen of methyl.

24. A cured composition, comprising the reaction product of:
 a methacrylate-capped poly(arylene ether); prepared by a method comprising oxidative coupling of at least one monohydroxyaromatic compound; and
 a fused alicyclic (meth)acrylate monomer having the formula

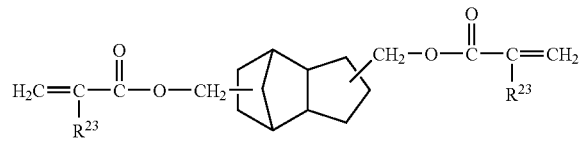

wherein each occurrence of $R^{23}$ is independently hydrogen or methyl.

25. A curable composition, comprising:
 about 5 to about 95 parts by weight of a methacrylate-capped poly(arylene ether);
 about 5 to about 95 parts by weight of a fused alicyclic (meth)acrylate monomer having the formula

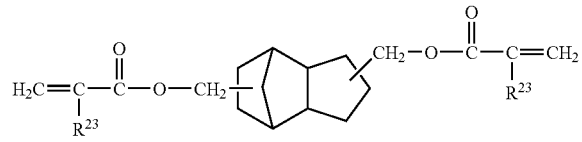

wherein each occurrence of $R^{23}$ is independently hydrogen or methyl;
 about 50 to about 600 parts by weight of calcium carbonate; and
 about 50 to about 600 parts by weight of glass fibers.

26. A cured composition, comprising the reaction product of:
 about 5 to about 95 parts by weight of a methacrylate-capped poly(arylene ether);
 about 5 to about 95 parts by weight of a fused alicyclic (meth)acrylate monomer having the formula

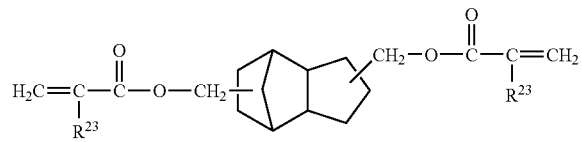

wherein each occurrence of $R^{23}$ is independently hydrogen or methyl;

about 50 to about 600 parts by weight of calcium carbonate; and about 50 to about 600 parts by weight of glass fibers.

27. An article comprising the composition of claim 24.

28. An article comprising the composition of claim 26.

29. The curable composition of claim 5, wherein the ring-functionalized poly(arylene ether) has an instrinsic viscosity of about 0.1 to about 0.4 deciliters per gram measured in chloroform at 25° C.

30. The curable composition of claim 5, wherein the ring-functionalized poly(arylene ether) has an instrinsic viscosity of about 0.01 to about 0.4 deciliters per gram measured in chloroform at 25° C.

31. The curable composition of claim 5, wherein the fused alicyclic (meth)acrylate monomer is 3α-(meth)acryloyloxyperhydroindene, 3α-(meth)acryloyloxy-7α-hydroxyperhydroindene, 3α,7α-bis[(meth)acryloyloxy]perhydroindene, 4α-(meth)acryloyloxydecalin, 4α,8α-bis[(meth)acryloyloxy]decalin, 4α-(meth)acryloyloxyperhydrofluorene, 4,8α-(meth)acryloyloxy-9α-hydroxyperhydrofluorene, 4α,9α-bis [(meth)acryloyloxy]perhydrofluorene, 4α-(meth)acryloyloxyperhydroanthracene, 4α-(meth)acryloyloxy-9α-hydroxyperhydroanthracene, 4α,9α-bis[(meth)acryloyloxy]perhydroanthracene, 10α-(meth)acryloyloxyperhydrophenanthrene, 10α-(meth)acryloyloxy-4α-hydroxyperhydrophenanthrene, 4α,10α-bis[(meth)acryloyloxy]perhydrophenanthrene, 2-(meth)acryloyloxytricyclo[5.2.1.0$^{2,6}$]decane, 2-(meth)acryloyloxy-6-hydroxytricyclo[5.2.1.0$^{2,6}$]decane, 2,6-bis[(meth)acryloyloxy] tricyclo[5.2.1.0$^{2,6}$]decane, 2,5-bis[(meth)acryloyloxy]tricyclo[5.2.1.0$^{2,6}$]decane, 2α-(meth)acryloyloxyperhydroacenaphthene, 2α-(meth)acryloyloxy-8α-hydroxyperhydroacenaphthene, 2α,8α-bis[(meth)acryloyloxy]perhydroacenaphthene, 3α-(meth)acryloyloxy]perhydroacenaphthene, 3α-(meth)acryloyloxy-9α-hydroxyperhydroacenaphthene, 3α,9α-bis[(meth)acryloyloxy]perhydroacenaphthene, or a combination thereof.

32. The curable composition of claim 16, wherein the fused alicyclic (meth)acrylate monomer is 3α-(meth)acryloyloxyperhydroindene, 3α-(meth)acryloyloxy-7α-hydroxyperhydroindene, 3α,7α-bis[(meth)acryloyloxy]perhydroindene, 4α-(meth)acryloyloxydecalin, 4α,8α-bis[(meth)acryloyloxy]decalin, 4α-(meth)acryloyloxyperhydrofluorene, 4α-(meth)acryloyloxy-9α-hydroxyperhydrofluorene, 4α,9α-bis[(meth)acryloyloxy]perhydrofluorene, 4α-(meth)acryloyloxyperhydroanthracene, 4α-(meth)acryloyloxy-9α-hydroxyperhydroanthracene, 4α-bis[(meth)acryloyloxy]perhydroanthracene, 10α-(meth)acryloyloxyperhydrophenanthrene, 10α-(meth)acryloyloxy-4α-hydroxyperhydrophenanthrene, 4α,1α-bis[(meth)acryloyloxy]perhydrophenanthrene, 2-(meth)acryloyloxy-6-hydroxytricyclo[5.2.1.0$^{2,6}$]decane, 2,6-bis[(meth)acryloyloxy] tricyclo[5.2.1.0$^{2,6}$]decane, 2,5-bis[(meth)acryloyloxy]tricyclo[5.2.1.0$^{2,6}$]decane, 2α-(meth)acryloyloxyperhydroacenaphthene, 2α-(meth)acryloyloxy-8α-hydroxyperhydroacenaphthene, 2α,8α-bis[(meth)acryloyloxy]perhydroacenaphthene, 3α-(meth)acryloyloxy]perhydroacenaphthene, 3α-(meth)acryloyloxy-9α-hydroxyperhydroacenaphthene, 3α,9α-bis[(meth)acryloyloxy]perhydroacenaphthene, or a combination thereof.

33. The curable composition of claim 5, wherein the fused alicyclic (meth)acrylate monomer has the formula

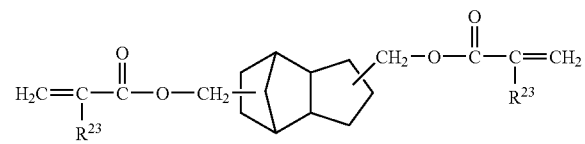

wherein each occurrence of R$^{23}$ is independently hydrogen or methyl.

34. The curable composition of claim 5, wherein about 0.02 mole percent to about 25 mole percent of the total L$^1$–L$^4$ substituents in the ring-functionalized poly(arylene ether) are the alkenyl groups wherein L$^5$–L$^7$ are hydrogen, and a is 0 or 1.

35. The curable composition of claim 34, wherein a is 1.

36. The curable composition of claim 1, wherein the at least one monohydroxyaromatic compound has a structure

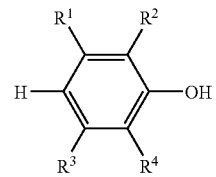

wherein R$^1$ and R$^3$ are each independently hydrogen, halogen, primary or secondary C$_1$–C$_{12}$ alkyl, C$_2$–C$_{12}$ alkenyl, C$_2$–C$_{12}$ alkynyl, C$_1$–C$_{12}$ aminoalkyl, C$_1$–C$_{12}$ hydroxyalkyl, phenyl, C$_1$–C$_{12}$ haloalkyl, C$_1$–C$_{12}$ hydrocarbyloxy, or C$_2$–C$_{12}$ halohydrocarbyloxy wherein at least two carbon atoms separate the halogen and oxygen atoms; R$^2$ and R$^4$ are each independently halogen, primary or secondary C$_1$–C$_{12}$ alkyl, C$_2$–C$_{12}$ alkenyl, C$_2$–C$_{12}$ alkynyl, C$_1$–C$_{12}$ aminoalkyl, C$_1$–C$_{12}$ hydroxyalkyl, phenyl, C$_{1-C12}$ hydroxycarbyloxy, or C$_2$–C$_{12}$ halohydrocarbyloxy wherein at least two carbon atoms separate the halogen and oxygen atoms.

* * * * *

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Title Page,
Item 56, References Cited, U.S. Patent Documents, after "3,306,875A", delete "2/1967" and insert therefor -- 5/81 --.

Title Page,
Item 56, Foreign Patent Documents, after "EP 206072", delete "9/86" and insert therefor -- 6/86 --.

Title Page,
Item 56, Other Publications, PCT/US2004/020868, after "Date of Mailing", delete "Nov. 11," and insert therefor -- Nov. 25 --.

Title Page,
Item 56, Other Publications, structural depiction, after "(2000-2001)", delete "page.*" and insert therefor -- page 1641 --.

Column 1,
Lines 17-18, after "to", delete "Zamoch" and insert therefor -- Zarnoch --.

Column 3,
Line 7, after "alkenyl", delete "$C_2$-$C_2$" and insert therefor -- $C_2$-$C_{12}$ --.

Column 3,
Line 7, after "alkenyl" (second occurrence), delete "$C_1$-$C_2$" and insert therefor -- $C_1$-$C_{12}$ --.

Column 6,
Line 26, after "[4,871,876]", delete "4,871.816," and insert therefor -- 4,871,816, --.
Line 36, after "prepared", delete "by," and insert therefor -- by --.

Column 7,
Line 43, after "of", delete "unsaturated" and insert therefor -- $\alpha,\beta$-unsaturated --.
Lines 47-48, after "of", delete "$\alpha,\beta$-hydroxy" and insert therefor -- $\beta$-hydroxy --.

Column 8,
Line 13, after "weight", delete "(Mn)" and insert therefor -- ($M_n$) --.
Line 35, after "0.3", delete "dl/g" and insert therefor -- dL/g --.

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Column 9,
Lines 7-44, delete formula and insert therefor
--

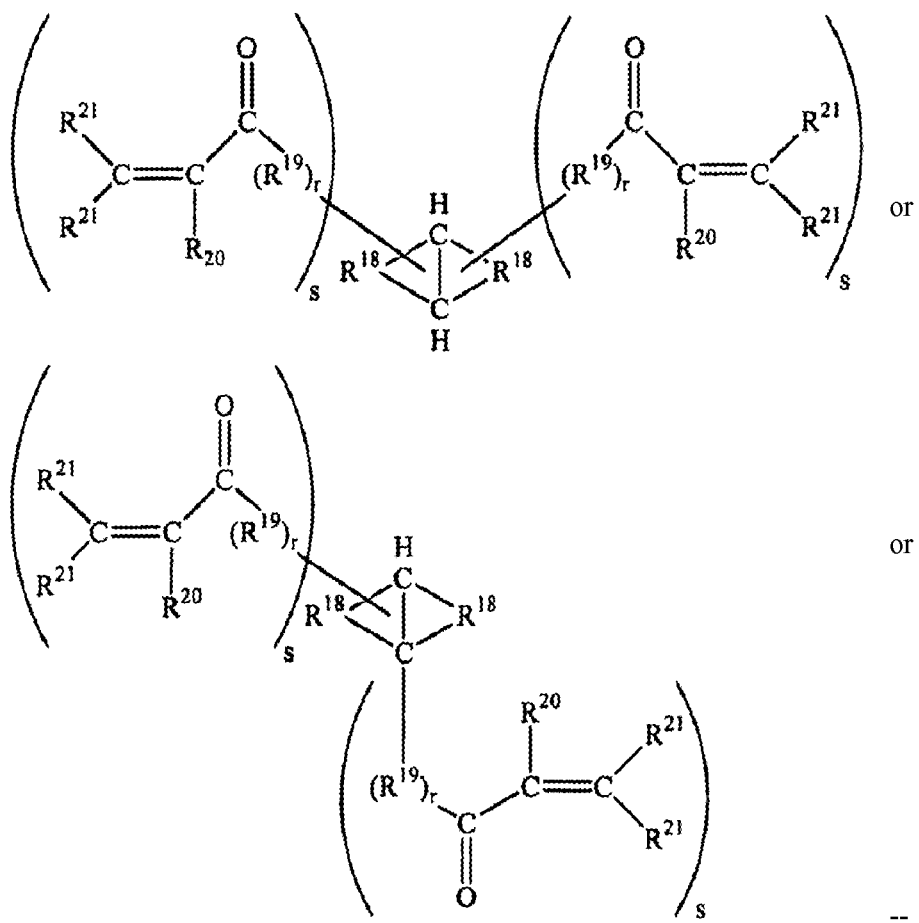

--

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Column 9,
Line 58, after "the", delete "$R_{18}$" and insert therefor -- $R^{18}$ --.

Column 10,
Lines 17-18 after "10 α-(meth)acryloyloxy-", delete "4αhydroxyperhydrophenanthrene," and insert therefor -- 4α-hydroxyperhydrophenanthrene --.

Column 10,
Line 22, after "tricyclo", delete "$[5.2.1.0^{2.6}]$" and insert therefor -- $[5.2.1.0^{2,6}]$ --.

Column 10,
Line 28, after "hydroxyperhydroacenaphthene,", delete "3,9α-bis" and insert therefor -- 3α,9α-bis --.

Column 11,
Line 59, after "amide", delete "$(LiN(C_2H_2)_2)$;" and insert therefor -- $(LiN(C_2H_5)_2)$; --.

Column 13,
Lines 29-31, after "silane,", delete "γaminopropyltriethoxysilane, γglycidoxpropyltrimethoxysilane, and γ-mercaptopropyltrimethoxysilane" and insert therefor -- γ-aminopropyltriethoxysilane, γ-glycidoxpropyltrimethoxysilane, and γ-mercaptopropyltrimethoxysilane" --.

Column 17,
Lines 46-47, after "5,000", delete "psi.A", and insert therefor -- psi. A --.

Column 18,
Line 43, after "poly(arylene", delete "ether); and" and insert therefor --ether) having --.

Column 21,
Line 17, after "or", delete "$C_1$-$C_{12}$" and insert therefor -- $C_2$-$C_{12}$ --.
Line 19, after "about", delete "200:" and insert therefor -- 200; --.
Line 21, after "alkenyl", delete "$C_2$-$C_{12}$alkenyl" and insert therefor -- $C_2$-$C_{12}$ alkenyl --.
Line 21, after "aminoalkyl," insert -- $C_1$-$C_{12}$ hydroxyalkyl, --.

Column 22,
Line 45, after "wherein", delete "$L_8$" and insert therefor -- $L^8$ --.
Line 47, after "total", delete "$L^1 L_4$ and insert therefor -- "$L^1 L^4$ --.
Line 57, after "an", delete "α,β-unsubstituted" and insert therefor -- α,β-unsaturated --.

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Column 23,
Lines 30-45, delete formula and insert therefor
--

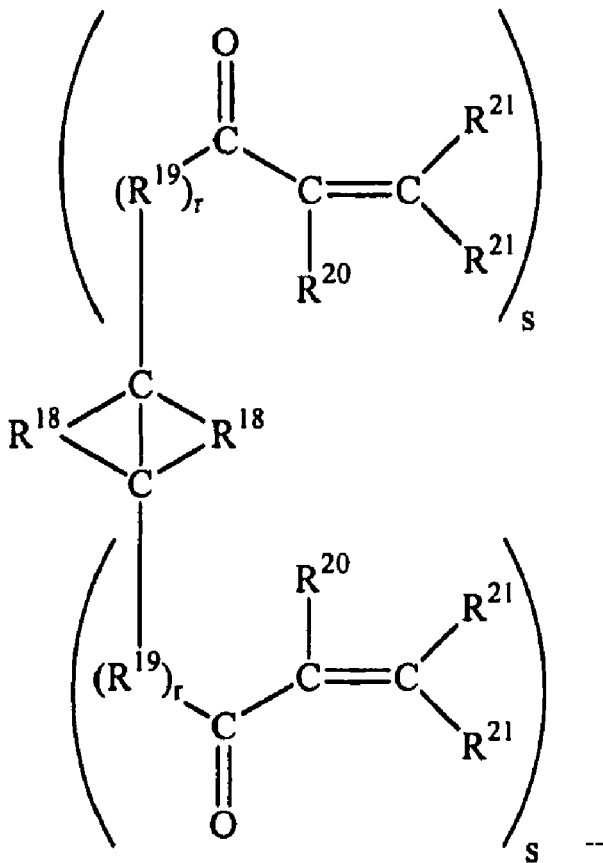

--

Column 25,
Line 16, after "1,4-divinylbenzene,", delete "11,3-" and insert therefor -- 1,3- --.
Line 39, after "a", delete "poly(arylene ether);" and insert therefor
-- poly(arylene ether) --.
Line 67, after "megahertz," delete "or" and insert therefor -- of --.

Column 26,
Line 19, after "poly(arylene", delete "ether);" and insert therefor -- ether) --.

UNITED STATES PATENT AND TRADEMARK OFFICE
CERTIFICATE OF CORRECTION

PATENT NO. : 7,226,980 B2  
APPLICATION NO. : 10/637943  
DATED : June 5, 2007  
INVENTOR(S) : Gary William Yeager It is certified that error appears in the above-identified patent and that said Letters Patent is hereby corrected as shown below:

Column 27,  
Line 8, after "about", delete "0.1 to about 0.4" and insert therefor -- 0.05 to about 0.6 --.  
Line 12, after "about", delete "0.01" and insert therefor -- 0.1 --.  
Line 20, after "acryloyloxperhydrofluorene,", delete "4,8α" and insert therefor -- 4α --.  
Line 30, after "decane,", delete "$^{2,6}$-" and insert therefor -- 2,6- --.  
Line 50, after "hydroxyperhydroanthracene," delete "4α-bis" and insert therefor -- 4α,9α-bis --.  
Line 54, after "hydroxyperhydrophenanthrene, delete 4α,1α-" and insert therefor -- 4α,10α- --.

Column 28,  
Line 30, after "has", delete "a" and insert therefor -- the --.  
Line 49, after "phenyl," delete "$C_{1}$-$C_{12}$ and insert therefor -- $C_{1}$-$C_{12}$ haloalkyl, $C_{1}$-$C_{12}$ --.

Signed and Sealed this

Fifteenth Day of January, 2008

JON W. DUDAS  
*Director of the United States Patent and Trademark Office*

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Title Page,
Item 56, References Cited, U.S. Patent Documents, after "3,306,875A", delete "2/1967" and insert therefor -- 5/81 --.
Item 56, Foreign Patent Documents, after "EP 206072", delete "9/86" and insert therefor -- 6/86 --.
Item 56, Other Publications, PCT/US2004/020868, after "Date of Mailing", delete "Nov. 11," and insert therefor -- Nov. 25 --.
Item 56, Other Publications, structural depiction, after "(2000-2001)", delete "page.*" and insert therefor -- page 1641 --.

Column 1,
Lines 17-18, after "to", delete "Zamoch" and insert therefor -- Zarnoch --.

Column 3,
Line 7, after "alkenyl", delete "$C_2$-$C_2$" and insert therefor -- $C_2$-$C_{12}$ --.
Line 7, after "alkenyl" (second occurrence), delete "$C_1$-$C_2$" and insert therefor -- $C_1$-$C_{12}$ --.

Column 6,
Line 26, after "[4,871,876]", delete "4,871.816," and insert therefor -- 4,871,816, --.
Line 36, after "prepared", delete "by," and insert therefor -- by --.

Column 7,
Line 43, after "of", delete "unsaturated" and insert therefor -- $\alpha,\beta$-unsaturated --.
Lines 47-48, after "of", delete "$\alpha,\beta$-hydroxy" and insert therefor -- $\beta$-hydroxy --.

Column 8,
Line 13, after "weight", delete "(Mn)" and insert therefor -- ($M_n$) --.
Line 35, after "0.3", delete "dl/g" and insert therefor -- dL/g --.

UNITED STATES PATENT AND TRADEMARK OFFICE
CERTIFICATE OF CORRECTION

PATENT NO. : 7,226,980 B2 Page 2 of 5
APPLICATION NO. : 10/637943
DATED : June 5, 2007
INVENTOR(S) : Gary William Yeager It is certified that error appears in the above-identified patent and that said Letters Patent is hereby corrected as shown below:

Column 9,
Lines 7-44, delete formula and insert therefor

--

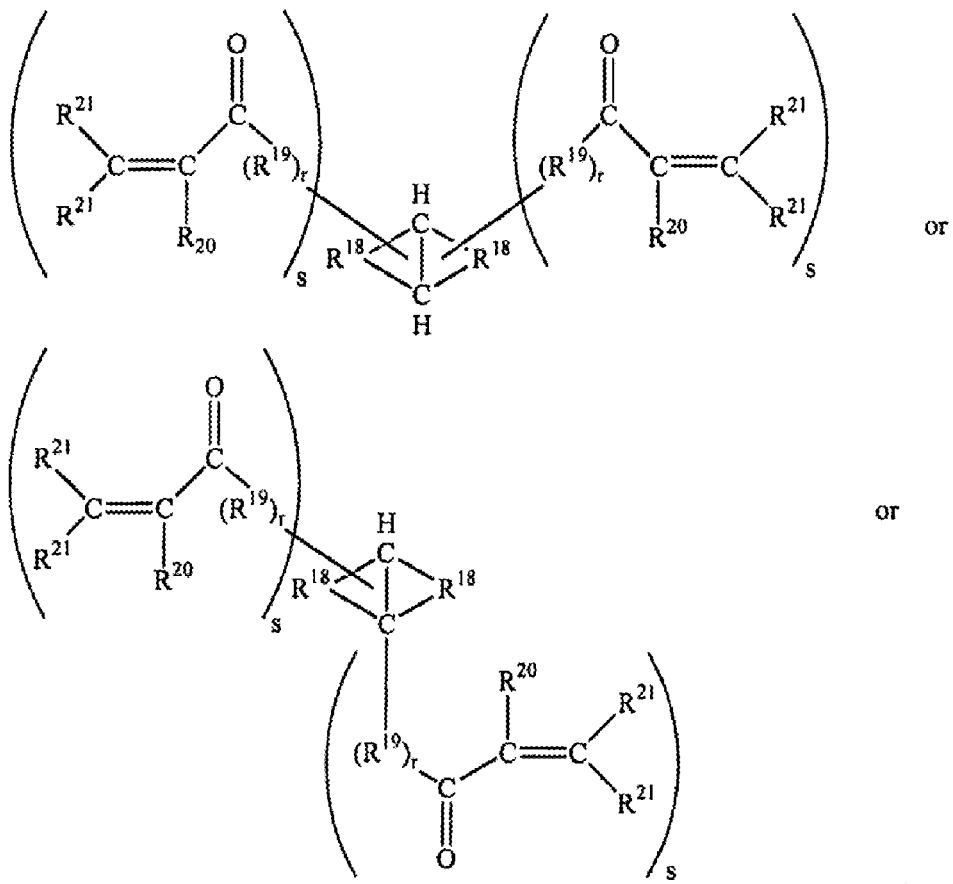

--

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Column 9,
Line 58, after "the", delete "$R_{18}$" and insert therefor -- $R^{18}$ --.

Column 10,
Lines 17-18 after "10 $\alpha$-(meth)acryloyloxy-", delete "4$\alpha$hydroxyperhydrophenanthrene," and insert therefor -- 4$\alpha$-hydroxyperhydrophenanthrene --.
Line 22, after "tricyclo", delete "$[5.2.1.0^{2.6}]$" and insert therefor -- $[5.2.1.0^{2,6}]$ --.
Line 28, after "hydroxyperhydroacenaphthene,", delete "3,9$\alpha$-bis" and insert therefor -- 3$\alpha$,9$\alpha$-bis --.

Column 11,
Line 59, after "amide", delete "$(LiN(C_2H_2)_2)$;" and insert therefor -- $(LiN(C_2H_5)_2)$; --.

Column 13,
Lines 29-31, after "silane,", delete "$\gamma$aminopropyltriethoxysilane, $\gamma$glycidoxpropyltrimethoxysilane, and $\gamma$-mercaptopropyltrimethoxysilane" and insert therefor -- $\gamma$-aminopropyltriethoxysilane, $\gamma$-glycidoxpropyltrimethoxysilane, and $\gamma$-mercaptopropyltrimethoxysilane" --.

Column 17,
Lines 46-47, after "5,000", delete "psi.A", and insert therefor -- psi. A --.

Column 18,
Line 43, after "poly(arylene", delete "ether); and" and insert therefor -- ether) having --.

Column 21,
Line 17, after "or", delete "$C_1-C_{12}$" and insert therefor -- $C_2-C_{12}$ --.
Line 19, after "about", delete "200:" and insert therefor -- 200; --.
Line 21, after "alkenyl", delete "$C_2-C_{12}$alkenyl" and insert therefor -- $C_2-C_{12}$ alkenyl --.
Line 21, after "aminoalkyl," insert -- $C_1-C_{12}$ hydroxyalkyl, --.

Column 22,
Line 45, after "wherein", delete "$L_8$" and insert therefor -- $L^8$ --.
Line 47, after "total", delete ""$L^1L_4$" and insert therefor -- "$L^1L^4$ --.
Line 57, after "an", delete "$\alpha,\beta$-unsubstituted" and insert therefor -- $\alpha,\beta$-unsaturated --.

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

Column 23,
Lines 30-45, delete formula and insert therefor

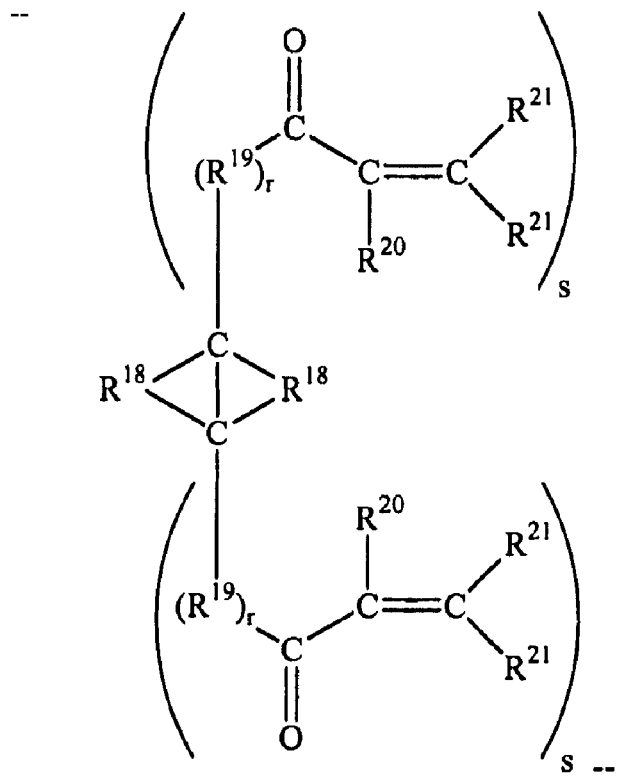

Column 25,
Line 16, after "1,4-divinylbenzene,", delete "11,3-" and insert therefor -- 1,3- --.
Line 39, after "a", delete "poly(arylene ether);" and insert therefor
-- poly(arylene ether) --.
Line 67, after "megahertz," delete "or" and insert therefor -- of --.

Column 26,
Line 19, after "poly(arylene", delete "ether);" and insert therefor -- ether) --.

UNITED STATES PATENT AND TRADEMARK OFFICE
CERTIFICATE OF CORRECTION

PATENT NO. : 7,226,980 B2
APPLICATION NO. : 10/637943
DATED : June 5, 2007
INVENTOR(S) : Gary William Yeager It is certified that error appears in the above-identified patent and that said Letters Patent is hereby corrected as shown below:

<u>Column 27,</u>
Line 8, after "about", delete "0.1 to about 0.4" and insert therefor -- 0.05 to about 0.6 --.
Line 12, after "about", delete "0.01" and insert therefor -- 0.1 --.
Line 20, after "acryloyloxperhydrofluorene,", delete "4,8α" and insert therefor -- 4α --.
Line 30, after "decane,", delete "$^{2,6}$-" and insert therefor -- 2,6- --.
Line 50, after "hydroxyperhydroanthracene," delete "4α-bis" and insert therefor
-- 4α,9α-bis --.
Line 54, after "hydroxyperhydrophenanthrene, delete "4α,1α-" and insert therefor
-- 4α,10α- --.

<u>Column 28,</u>
Line 30, after "has", delete "a" and insert therefor -- the --.
Line 49, after "phenyl," delete "$C_{1-C12}$" and insert therefor --$C_{1-12}$ haloalkyl, $C_1$-$C_{12}$ --.

Signed and Sealed this

Twenty-ninth Day of January, 2008

JON W. DUDAS
*Director of the United States Patent and Trademark Office*